United States Patent Office 3,321,277
Patented May 23, 1967

3,321,277
LITHIUM OXIDE HAVING ACTIVE ABSORPTION CAPACITY FOR CARBON DIOXIDE AND METHOD OF PREPARING SAME
Ricardo O. Bach, Gastonia, N.C., assignor to Lithium Corporation of America, Inc., New York, N.Y., a corporation of Minnesota
No Drawing. Filed Jan. 15, 1964, Ser. No. 337,754
8 Claims. (Cl. 23—184)

This invention relates to the preparation of a new and useful lithium oxide having active absorption capacity for carbon dioxide.

Lithium oxide, as prepared by known methods and in the forms in which it is known to the art, is an extremely poor absorbent for carbon dioxide, indeed, so much so that it is, for all practical purposes, of no value for this purpose, particularly for use in atmospheric purification or air regeneration applications in manned sealed environments. No lithium oxide has heretofore been known having high carbon dioxide absorption capacity nor has any method heretofore been suggested, so far as is known, for producing lithium oxide in a form in which such properties are achieved.

In accordance with the present invention, a novel method has been evolved and which also provides a novel lithium oxide in a highly active form for carbon dioxide absorption. The invention is based, in part, upon the discovery that when lithium peroxide is prepared in a manner and form hereinafter described in detail and is then thermally decomposed under certain conditions, lithium oxide having an unusually high capacity for absorbing carbon dioxide is obtained. In achieving the objectives of this invention, the lithium peroxide starting material advantageously should have a purity of at least 90%, and especially desirably at least 95%, usually 97% to 98%, or higher.

Briefly and generally speaking, the method of the present invention includes the steps of forming lithium peroxide of the purity indicated into particles, fragments or granules having a connected porous structure. The lithium peroxide in this form advantageously is then heated to a temperature within a range sufficiently high to effect thermal decomposition of the peroxide to lithium oxide while not appreciably affecting the porosity or connected porous structure of the particles, fragments or granules.

While various procedures may be utilized in obtaining a lithium peroxide starting material of the desired purity, in accordance with the particularly preferred aspects of the present invention especially advantageous results are attained with a high purity lithium peroxide produced by the method of my copending patent application, Ser. No. 213,865, filed Oct. 19, 1962, now U.S. Patent No. 3,185,-546. The method disclosed in that application involves providing a reaction mixture, in the form of a slurry, desirably containing a 27% to 98% water solution of hydrogen peroxide and a solid lithium hydroxide monohydrate having a lithium hydroxide content of from about 50% to 60%. Approximately stoichiometric or theoretical proportions of the lithium hydroxide and the hydrogen peroxide, namely, a lithium hydroxide to hydrogen peroxide molar ratio of about 2:1, are employed, with especially satisfactory results being obtained when the lithium hydroxide component is used in slight excess, or in a molar ratio of lithium hydroxide to hydrogen peroxide of the order of 2.1 to 2.8 of the lithium hydroxide to 1 of the hydrogen peroxide. The hydrogen peroxide and lithium peroxide are permitted to react at the ambient temperature of the mixture until the temperature thereof recedes to a temperature within the range of from about room temperature to about 40 degrees C. Thereafter, in accordance with one aspect of the method disclosed in my copending application, a water-soluble organic liquid, such as methanol, which is essentially a non-solvent for and substantially unreactive with respect to lithium peroxide, is introduced to inhibit solubilization of the lithium peroxide in the water present in the reaction mixture. The methanol or similar water-soluble organic liquid is added to the reaction mixture in a volume such that the volume ratio of the methanol or similar water-soluble organic liquid to water present in the reaction mixture is in the range of from about 2:1 to about 1:2. Following addition of the organic liquid to the reaction mixture, the solid phase in the slurry, which is essentially the desired lithium peroxide, can be separated from the slurry by known filtration procedures.

While, in the method of the aforementioned copending patent application, drying of the lithium peroxide is effected by passing a stream of warm, dry air, free of carbon dioxide, therethrough, it is desirable, in accordance with the practice of the present invention, that the lithium peroxide be left in a moistened condition. In achieving the objectives of this invention, the moistened lithium peroxide advantageously is formed into generally spherical or cylindrical pellets of a size ranging from 20 mm. to 30 mm. in radius. Formation of the lithium peroxide pellets may be accomplished by various pelletizing procedures generally known to the art. One method that may be employed to advantage involves the use of a hydraulic press which may be of the hand operated type. Utilizing such a press, it has been found that lithium peroxide pellets of the desired size and porosity can be obtained by applying a pressure of from 2000 to 2500 pounds per square inch, usually 2200 to 2400 pounds per square inch, over a period of two to three minutes, to each of the pellets.

Following formation of the lithium peroxide into pellets, the pellets desirably are reduced to particles, fragments or granules varying in size generally from about $\frac{1}{16}$ inch to $\frac{5}{8}$ inch, usually about $\frac{1}{8}$ inch to $\frac{1}{2}$ inch, in diameter. While the pellets may be fractured in any manner known in the art, it is important to the attainment of the objectives of the present invention that this operation be performed with a minimum production of fines. Due to the moistened condition of the lithium peroxide, pelletizing of the lithium peroxide and fracturing of pellets advantageously is carried out in an atmosphere free of carbon dioxide or low in content of carbon dioxide to substantially prevent or reduce formation of undesired impurities such as lithium carbonate.

After fracturing the lithium peroxide pellets into the proper sized granules, the granules desirably are then heated under vacuum until essentially dry. This step in the method of the present invention advantageously is carried out over a period of 1 to 2 hours, during which time the lithium peroxide granules are heated from about 25 degrees C. or room temperature to about 200 degrees C., usually to about 185 to 195 degrees C. A vacuum of from 1 to 3 mm. of mercury is applied throughout the drying period, and the operation desirably is performed in a substantially carbon dioxide-free atmosphere. The dry lithium peroxide obtained in accordance with this step of the invention does not react readily with water vapor or carbon dioxide, especially in the concentrations thereof found in room air, and, therefore, the dry lithium peroxide granules may be handled in air in succeeding steps of the method without the necessity for taking special precautions against contamination by these agents.

Lithium oxide having active absorption capacity for carbon dioxide is obtained in accordance with the practice of the present invention by thermally decomposing the dry lithium peroxide produced as hereinabove described. Thermal decomposition of the peroxide advantageously is carried out by slowly heating the peroxide to a temperature range sufficiently high to effect release of oxygen from the peroxide and yet maintain in large measure the connected porous structure established in the peroxide by the preceding steps of the method. Ideally, the temperature range at which the decomposition of the peroxide and formation of the absorption grade oxide occurs should be such as to give a connected porous structure having a molar-volume ratio of 15/20 or 0.75, which ratio indicates a 25% connected void in the oxide. Good results are attained by heating the lithium peroxide granules at a temperature ranging from 225 degrees C. to 450 degrees C., usually from 300 degrees C. to 380 degrees C. Generally speaking, the total time elapsed in decomposing the peroxide by the method of this invention varies from 15 to 30 hours, usually 20 to 25 hours, and the heating desirably takes place at a rate such that the temperature of the peroxide will rise approximately five degrees per minute. The heating advantageously is carried out at reduced pressures in an inert atmosphere to facilitate withdrawal of the volatiles formed during decomposition and to prevent the formation of low fusion point impurities which may affect the porosity of the lithium oxide obtained. The lithium oxide final product is substantially dust-free and is stable at temperatures in the range of 40 to 120 degrees F. making it ideally suitable for atmospheric purification in sealed manned environments.

The following example is illustrative of the above-described procedure which has been found to be highly useful in producing lithium oxide having active absorption capacity for carbon dioxide. It will be understood that various changes can be made therein in the light of the guiding principles disclosed above without in any manner departing from the fundamental teachings contained herein.

Example

A lithium peroxide starting material was prepared by mixing 59 grams of 46.4% hydrogen peroxide (74% of that required stoichiometrically) quickly into 94.4 grams of $LiOH \cdot H_2O$ (55.3% lithium hydroxide) while stirring vigorously. The temperature rose to 65 degrees C., remained there for about 2 minutes, and then fell to about 30 degrees C., 2 minutes after which the color of the slurry changed from a snow white to a tan color. After 10 minutes of stirring to ensure that the slurry has been thoroughly mixed, 23.4 grams of 46.4% hydrogen peroxide were added (29.4% of that required stoichiometrically). The temperature rose to 45 degrees C. After 20 minutes of stirring, 50 ml. of methyl alcohol were added, the temperature dropping to 35 degrees C. The temperature rose from 35 degrees C. to 40 degrees C. and the tan color lightened noticeably. After the slurry was cooled to about 30 degrees C., it was pressure filtered, reslurried with 30 ml. of methyl alcohol, filtered, washed with 25 ml. of pentane, and filtered. The starting lithium peroxide thus obtained assayed at 33.8% active oxygen, or 97.2% lithium peroxide.

The lithium peroxide produced in accordance with the foregoing procedure was formed into pellets using a hand operated hydraulic press with 2200 to 2400 pounds per square inch of pressure being applied to each pellet over a period of 2 to 3 minutes. The pellets were about 22 mm. in radius and were somewhat fractured in removing from the die. The lithium peroxide fragments, varying in dimensions from 1/8 to 1/2 inch in diameter, were heated under a vacuum of 1 to 3 mm. of mercury from room temperature to 192 degrees C. over a period of 1½ hours. The dry product thus obtained contained 33.2% active oxygen.

The dry granules of the lithium peroxide were then heated under a vacuum of 1 to 3 ml. of mercury over a period of 22 hours and 47 minutes under an argon flow of approximately 125 ml. per minute. The granules reached a temperature of 386 degrees C.

The lithium oxide, obtained as described above, was then tested to determine its efficiency for absorbing carbon dioxide from a 3.6% carbon dioxide-air mixture. The absorption test was performed, with some modifications, according to the Military Specification for Lithium Hydroxide, MIL–L–20213D (SHIPS), Dec. 11, 1959, Section 4.6.6, utilizing conventional apparatus. The modifications consisted of (1) in using a granule size considerably above the specification, and (2) in decreasing the gas flow through the lithium oxide granules whenever the $CO_2$ content of the effluent gas rose above ½ of the content of the incoming gas. The carbon dioxide-air mixture was permitted to flow over a sample having an initial weight of 42.22 grams at rates varying from 800 ml. per minute to as high as 3500 ml. per minute over a period of approximately 200 minutes. At the end of the run the sample weighed 54.5 grams. The test results are summarized in the following table:

|  | Before Test | | After Test | | $CO_2$ Absorbed (g.) | $H_2O$ Absorbed (g.) |
| --- | --- | --- | --- | --- | --- | --- |
|  | Percent | Wt. in sample (g.) | Percent | Wt. in sample (g.) |  |  |
| $O_A$ | 0.1 | .04 | 0.0 | 0.0 |  |  |
| Total $Li_2O$ | 98.6 | 40.9 | 62.1 | 33.8 |  |  |
| $Li_2CO_3$ | 2.4 | 1.0 | 29.8 | 16.3 | 9.1 |  |
| $H_2O$ | 0.7 | 0.3 | 8.4 | 4.4 |  | 5.2 |

Approximately 44% of the $CO_2$, and 64% of the water vapor, flowing through the granular lithium oxide was absorbed.

While the invention has been described in detail, it is to be understood that various modifications may be made in the light of the teachings herein without departing from the spirit and scope of the invention.

What is claimed is:

1. A method of preparing lithium oxide having active absorption capacity for carbon dioxide comprising the steps of providing substantially pure anhydrous lithium peroxide in the form of granules having a connected porous structure, and thermally converting said peroxide to lithium oxide under conditions to substantially maintain the connected porous structure of the granules by slowly heating it at a temperature of from 225 degrees C. to 450 degrees C. under reduced pressure in an inlet atmosphere.

2. A method of preparing lithium oxide having active absorption capacity for carbon dioxide comprising the steps of providing moistened lithium peroxide, pelletizing said peroxide, reducing the pelletized peroxide to granules having a connected porous structure, drying the granules of peroxide, and thermally decomposing the dried granules of said peroxide under conditions to substantially maintain the connected porous structure of the granules at a temperature of from 225 degrees C. to 450 degrees C. to obtain lithium oxide.

3. A method of preparing lithium oxide having active absorption capacity for carbon dioxide comprising the steps of providing lithium peroxide having a purity of at least 90%, pelletizing the said peroxide to form a connected porous structure, reducing the pellets to granules having a connected porous structure, and slowly heating said granules under conditions to substantially maintain the connected porous structure of the granules at a temperature of from 300 degrees C. to 380 degrees C. under a vacuum of 1 to 5 mm. of mercury to form lithium oxide.

4. A method of preparing lithium oxide having active absorption capacity for carbon dioxide comprising the steps of producing a substantially pure lithium peroxide by forming a reaction mixture of an aqueous solution of hydrogen and a solid lithium hydroxide, the concentration of the hydrogen peroxide and the lithium hydroxide in the mixture being such as to give a weight ratio of water present in the mixture to lithium peroxide formed by the reaction of the hydrogen peroxide with the lithium hydroxide of from 2:1 to about 5:1, permitting the hydrogen peroxide and the lithium hydroxide to react at the ambient temperature of the mixture, recovering the lithium peroxide formed from the mixture, comprising the lithium peroxide obtained into discrete units consisting essentially of interconnected particles of lithium peroxide, drying the compressed lithium peroxide at a temperature of from about 25° C. to 195° C. to provide a porous structure of said interconnected particles, and heating the porous structure at a temperature of from about 300° C. to about 380° C. to effect thermal decomposition of lithium peroxide to lithium oxide, said heating of the porous structure being carried out under conditions such that the formation and melting of low fusion point impurities in the structure which may adversely affect the porosity of the porous lithium oxide structure obtained are substantially prevented.

5. A method preparing lithium oxide having active absorption capacity for carbon dioxide comprising the steps of providing lithium peroxide in a moistened, compressed state, drying the moistened and compressed lithium peroxide at a temperature of from about 25° C. to about 200° C. to provide a porous structure consisting essentially of interconnected lithium peroxide particles, and heating the porous structure at a temperature of from about 225° C. to about 450° C. to effect thermal decomposition of lithium peroxide to lithium oxide, said heating of the porous structure being carried out under conditions such that the formation and melting of low fusion point impurities in the structure which may adversely affect the porosity of the porous lithium oxide structure obtained are substantially prevented.

6. A method of preparing lithium oxide having active absorption capacity for carbon dioxide comprising the steps of providing lithium peroxide in a moistened, compressed state, drying the moistened and compressed lithium peroxide at a temperature of from about 25° C. to about 195° C. to provide a porous structure consisting essentially of interconnected lithium peroxide particles, and heating the porous structure at a temperature of from about 300° C. to about 380° C. to effect thermal decomposition of lithium peroxide to lithium oxide, said heating of the porous structure being carried out under conditions such that the formation and melting of low fusion point impurities in the structure which may adversely affect the porosity of the porous lithium oxide structure obtained are substantially prevented.

7. A method of preparing lithium oxide having active absorption capacity for carbon dioxide comprising the steps of providing lithium peroxide in a moistened condition, compressing the moistened lithium peroxide, drying the compressed lithium peroxide at a temperature of from about 25° C. to about 200° C. to provide a porous structure consisting essentially of interconnected lithium peroxide particles, and heating the porous structure at a temperature of from about 300° C. to about 380° C. to effect thermal decomposition of lithium peroxide to lithium oxide, said heating of the porous structure being carried out under conditions such that the formation and melting of low fusion point impurities in the structure which may adversely affect the porosity of the porous lithium oxide structure obtained are substantially prevented.

8. A porous lithium oxide structure having high absorptive capacity for carbon dioxide, comprising substantially dust-free, coarse granules of intimately interconnected particles of lithium oxide of at least 90% purity, said granules having a size ranging from about 1/16 inch to 5/8 inch and a molar-volume ratio of about 15/20.

References Cited by the Examiner

"Inorganic Synthesis," vol. V, McGraw Hill, 1957, pp. 4, 5, and 6.

OSCAR R. VERTIZ, *Primary Examiner.*

J. J. BROWN, E. J. MEROS, *Assistant Examiners.*